US006458733B1

(12) United States Patent
Eckert

(10) Patent No.: US 6,458,733 B1
(45) Date of Patent: Oct. 1, 2002

(54) REINFORCED REFRACTORY PRODUCT

(76) Inventor: C. Edward Eckert, 260 Lynn Ann Dr., New Kensington, PA (US) 15068

( * ) Notice: Subject to any disclaimer, the term of this patent is extended or adjusted under 35 U.S.C. 154(b) by 179 days.

(21) Appl. No.: 09/648,814

(22) Filed: Aug. 25, 2000

Related U.S. Application Data

(63) Continuation-in-part of application No. 09/228,741, filed on Jan. 12, 1999, now abandoned.

(51) Int. Cl.[7] ...................... C04B 35/101; C04B 35/76; B29C 39/02

(52) U.S. Cl. .................... 501/95.1; 501/95.2; 501/127; 264/279

(58) Field of Search .............................. 501/95.1, 95.2, 501/95.3, 127, 128; 264/279, 402, 279.1, 271.1

(56) References Cited

U.S. PATENT DOCUMENTS

| | | | | |
|---|---|---|---|---|
| 4,366,255 A | * 12/1982 | Lankard | 428/703 |
| 4,764,488 A | * 8/1988 | Saito et al. | 428/364 |
| 5,290,737 A | * 3/1994 | Andersson et al. | 427/419.6 |
| 5,308,572 A | * 5/1994 | Hackman | 264/102 |
| 5,459,114 A | * 10/1995 | Kaya et al. | 501/96 |
| 5,571,628 A | * 11/1996 | Hackman | 428/34.4 |
| 6,210,786 B1 | * 4/2001 | Atmur et al. | 428/293.4 |

FOREIGN PATENT DOCUMENTS

| | | | |
|---|---|---|---|
| FR | 2805808 A1 | * 9/2001 |
| GB | 2173185 A | * 10/1986 |
| JP | 63288161 A | * 11/1988 |
| WO | WO 01/53068 A2 | * 7/2001 |

* cited by examiner

*Primary Examiner*—M. Alexandra Elve
*Assistant Examiner*—Colleen P. Cooke
(74) *Attorney, Agent, or Firm*—Andrew Alexander

(57) ABSTRACT

A method for preparing a metal reinforced refractory body comprising the steps of providing a mold for containing a slurry of refractory material. A body of metal fibers is inserted into the mold, the metal fibers having a coefficient of thermal expansion of less than $10\times10^{-6}$ in/in/° F. and a yield strength of greater than 35 KSI at 1200° F. The slurry of refractory material is introduced to the mold to provide the slurry in intimate contact with the metal fibers, the refractory material in the hardened condition having a coefficient of thermal expansion of less than $10\times10^{-6}$ in/in/° F. The refractory material is hardened to provide a metal reinforced composite refractory body comprised of a reinforcing component and a refractory component having a coefficient of thermal expansion of less than $10\times10^{-6}$ in/in/° F. to minimize cracking of the refractory body.

19 Claims, No Drawings

REINFORCED REFRACTORY PRODUCT

CROSS REFERENCE TO RELATED APPLICATIONS

This application is a continuation-in-part of U.S. Ser. No. 09/228,741, filed Jan. 12, 1999 now abandoned.

BACKGROUND OF THE INVENTION

This invention relates to refractory products and more particularly it relates to an improved reinforced refractory having improved resistance to cracking at elevated temperatures.

Reinforcement such as fiber reinforcement has been used to improve the strength of refractory products. This concept is disclosed in U.S. Pat. No. 4,366,255. This patent discloses the use of stainless steel and carbon steel fibers. However, stainless steel fiber and carbon steel fibers have the problem that they initiate cracks in the refractory, particularly in elevated temperature applications. This exposes the metal fibers and results in further cracking of the refractory body. If, for example, the refractory body is in contact with molten aluminum, the exposed steel fibers are dissolved resulting in catastrophic failure of the refractory body. Varying the amount of metal fibers or employing different release agents still resulted in cracking of the refractory body.

Thus, it will be seen that there is a great need for a reinforced refractory which is not subject to cracking, particularly at elevated temperatures. The subject invention provides such an improved body.

SUMMARY OF THE INVENTION

It is an object of this invention to provide an improved refractory body.

It is another object of this invention to provide an improved metal reinforced refractory body highly resistant to cracking at elevated temperatures.

It is a further object of this invention to provide an improved metal reinforced refractory body wherein the body is reinforced with metal fibers comprised of nickel based alloys.

It is a further object of the invention to provide an improved refractory body reinforced with a metal material having a coefficient of thermal expansion of less than $10\times10^{-6}$ in/in/° F. and preferably less than $5\times10^{-6}$ in/in/° F.

And yet it is a further object of the invention to provide a metal reinforced refractory body wherein the refractory is controlled to have a coefficient of thermal expansion of less than $10\times10^{-6}$ in/in/° F. and preferably $5\times10^{-6}$ in/in/° F.

These and other objects will become apparent from a reading of the specification and claims appended hereto.

In accordance with these objects, there is provided a method for preparing a metal reinforced refractory body comprising the steps of providing a mold for containing a slurry of refractory material. A body of metal fibers is inserted into the mold, the metal fibers having a coefficient of thermal expansion of less than $10\times10^{-6}$ in/in/° F. The slurry of refractory material is introduced to the mold to provide the slurry in intimate contact with the metal fibers, the refractory material in the hardened condition having a coefficient of thermal expansion of less than $10\times10^{-6}$ in/in/° F. The refractory material is hardened to provide a metal reinforced composite refractory body comprised of a reinforcing component and a refractory component having a coefficient of thermal expansion of less than $10\times10^{-6}$ in/in/° F. to minimize cracking of the refractory body.

This method provides a metal reinforced refractory body comprised of a metal component having a coefficient of thermal expansion of less than $10\times10^{-6}$ in/in/° F. and a refractory component having a coefficient of thermal expansion of less than $10\times10^{-6}$ in/in/° F., the body being highly resistant to cracking at elevated temperatures.

DETAILED DESCRIPTION OF THE PREFERRED EMBODIMENTS

The refractory materials useful in the present invention can include alumina, silica, silicon carbide, base material or mixtures thereof. The refractory material can utilize mullite, kyanite, bauxite and kaolin, for example. Any refractory material may be used, depending on the end use. If the use is high temperature application, then the alumina, silica, or silica carbide are particularly useful. These materials are usually ground to provide a particle size preferably not greater than about 40 mesh with smaller particle size being preferred, e.g., less than about 30 mesh, to facilitate mixing with metal fiber reinforcing material. That is, the use of large particles resist mixing or intrusion into the metal fiber matrix, resulting in voids which adversely affect the integrity of the reinforced refractory body. Further, smaller particle size improves the fluidity of the refractory when mixed with a refractory cement prior to infiltrating the metal fiber matrix.

For purposes of preparing a mix for infiltrating the metal fiber matrix, the refractory material is mixed with a refractory cement such as calcium aluminate cement, gypsum, sodium silicate or the like to provide a mix. However, any refractory cement may be used, depending on the end use. The cement typically is used in equal parts with the refractory material; however, adjustments can be made to add more or less cement as desired.

It will be appreciated that water is added to the mix in the range of about 10 to 35 wt. % or more to provide a slurry suitable for intruding or pressure infiltrating the metal fiber matrix. Plasticizers may be added to the mix to aid in infiltrating the metal fiber matrix.

Refractory bodies of the present invention have many uses in high temperature applications such as in molten metal, for example, molten aluminum. Thus, it is important that the refractory have high durability and furthermore it is important that the metal component used have a low coefficient of thermal expansion and preferably high oxidation resistance at elevated temperatures. The low coefficient of thermal expansion is important to avoid cracking of the refractory body at high temperatures. The high oxidation resistance is important to minimize high temperature oxidation in environments where fibers are exposed to above metal line applications.

In the present invention, the metal component, e.g., metal fibers, must be carefully selected to provide the low coefficient of thermal expansion. Thus, the metal component can be comprised of nickel based alloys, iron-nickel based alloys, iron-nickel-cobalt based alloys and titanium based alloys. Preferably, the metal component is comprised of an alloy having a coefficient of thermal expansion of less than $10\times10^{-6}$ in/in/° F. and preferably less than $7\times10^{-6}$ in/in/° F. Typically, such coefficients of thermal expansion are applicable over a temperature range of about 400° to 2000° F. Further, it is preferred that such alloys have an oxidation resistance (as measured by weight gain) of less than about 15 $mg/cm^2$, typically less than 5 $mg/cm^2$.

The nickel based alloys include Incoloy alloys 903, 907, 908 and 909; Inconel alloys 783 and 718; Thermo-Span; Haynes alloy 242; and Nilo alloys 36 and 42. These alloys have the following compositions:

Nominal Chemical Compositions (wt. %)

| | Ni | Fe | Co | Cr | Nb | Al | Ti | Si | Other |
|---|---|---|---|---|---|---|---|---|---|
| Incoloy alloy 903 | 38.0 | 42.0 | 15.0 | — | 3.0 | 0.9 | 1.4 | — | — |
| Incoloy alloy 907 | 38.0 | 42.0 | 13.0 | — | 4.7 | 0.03 | 1.5 | 0.15 | — |
| Incoloy alloy 909 | 38.0 | 42.0 | 13.0 | — | 4.7 | 0.03 | 1.5 | 0.4 | — |
| Incoloy alloy 783 | 28.5 | 26.0 | 34.0 | 3.0 | 3.0 | 5.4 | 0.1 | — | — |
| Incoloy alloy 718 | 52.5 | 18.5 | — | 19.0 | 5.13 | 0.50 | 0.90 | .18 | 3.05 Mo |
| Thermo-Span | 25 | 34 | 29 | 5.5 | 4.8 | 0.5 | 0.8 | 0.3 | — |
| Haynes alloy 242 | 64 | 1.0 | 1.25 | 8.0 | — | 0.25 | — | 0.4 | 25.0 Mo |
| Nilo alloy 36 | 36.0 | 64.0 | — | — | — | — | — | — | — |
| Nilo alloy 42 | 42.0 | 58.0 | — | — | — | — | — | — | — |
| Incoloy alloy 908 | 49 | 41 | — | 4 | 3 | 1 | 1.5 | — | — |

Other controlled expansion alloys include: Ni-Fe-Co Incoloy alloy 904, and Inconel alloy 625.

Titanium alloys having controlled or low coefficient of thermal expansion include CP (commercial purity) grade titanium, or alpha and beta titanium alloys or near alpha titanium alloys, or alpha-beta titanium alloys. The alpha or near-alpha alloys can comprise, by wt. %, 2 to 9 Al, 0 to 12 Sn, 0 to 4 Mo, 0 to 6 Zr, 0 to 2 V and 0 to 2 Ta, and 2.5 max. each of Ni, Nb and Si, the remainder titanium and incidental elements and impurities.

Specific alpha and near-alpha titanium alloys contain, by wt. %, about:

(a) 5 Al, 2.5 Sn, the remainder Ti and impurities.

(b) 8 Al, 1 Mo, 1 V, the remainder Ti and impurities.

(c) 6 Al, 2 Sn, 4 Zr, 2 Mo, the remainder Ti and impurities.

(d) 6 Al, 2 Nb, 1 Ta, 0.8 Mo, the remainder Ti and impurities.

(e) 2.25 Al, 11 Sn, 5 Zr, 1 Mo, the remainder Ti and impurities.

(f) 5 Al, 5 Sn, 2 Zr, 2 Mo, the remainder Ti and impurities.

The alpha-beta titanium alloys comprise, by wt. %, 2 to 10 Al, 0 to 5 Mo, 0 to 5 Sn, 0 to 5 Zr, 0 to 11 V, 0 to 5 Cr, 0 to 3 Fe, with 1 Cu max., 9 Mn max., 1 Si max., the remainder titanium, incidental elements and impurities.

Specific alpha-beta alloys contain, by wt. %, about:

(a) 6 Al, 4 V, the remainder Ti and impurities.

(b) 6 Al, 6 V, 2 Sn, the remainder Ti and impurities.

(c) 8 Mn, the remainder Ti and impurities.

(d) 7 Al, 4 Mo, the remainder Ti and impurities.

(e) 6 Al, 2 Sn, 4 Zr, 6 Mo, the remainder Ti and impurities.

(f) 5 Al, 2 Sn, 2 Zr, 4 Mo, 4 Cr, the remainder Ti and impurities.

(g) 6 Al, 2 Sn, 2 Zn, 2 Mo, 2 Cr, the remainder Ti and impurities.

(h) 10 V, 2 Fe, 3 Al, the remainder Ti and impurities.

(i) 3 Al, 2.5 V, the remainder Ti and impurities.

The beta titanium alloys comprise, by wt. %, 0 to 14 V, 0 to 12 Cr, 0 to 4 Al, 0 to 12 Mo, 0 to 6 Zr and 0 to 3 Fe, the remainder titanium and impurities.

Specific beta titanium alloys contain, by wt. %, about:

(a) 13 V, 11 Cr, 3 Al, the remainder Ti and impurities.

(b) 8 Mo, 8 V, 2 Fe, 3 Al, the remainder Ti and impurities.

(c) 3 Al, 8 V, 6 Cr, 4 Mo, 4 Zr, the remainder Ti and impurities.

(d) 11.5 Mo, 6 Zr, 4.5 Sn, the remainder Ti and impurities.

These alloys are illustrative of the invention and other alloys may be used having low coefficient of thermal expansion and preferably with high oxidation resistance.

As well as having a low coefficient of thermal expansion, the metal fibers must have high strength at elevated temperatures for high temperature applications, such as for use with molten aluminum. For example, stainless steels have high oxidation resistance and good strength at room temperature, but at elevated temperatures, strength drops off as temperature rises. For example, when stainless steels are compared to nickel based alloys at 1200° F. the yield strength properties (0.2% offset) are inferior, as will be seen in the following Table.

| Material | YS KSI at 1200° F. |
|---|---|
| 302 SS | 12 |
| 321 SS | 19 |
| 309 SS | 26 |
| 410 SS | 27 |
| Hastealloy X | 40 |
| Hastealloy S | 47 |
| Waspalloy | 100 |
| Inconel X-750 | 103 |
| Inconel IN-718 | 148 |

In the present invention, it is preferred that such alloys be used in fibrous form and may be used in mat form where chopped fibers are formed into mats before using in the mold. Preferably, the fibers are less than about 5 inches long with a diameter of less than 50 mils.

It will be appreciated that plasticizing agents may be used to facilitate intrusion of the fibers with the slurry. Further, infiltration of the fibers can be further facilitated by applying vibrating and/or vacuum means to the mold to improve impregnation of the fibers with slurry. After the slurry has been added, typically the refractory body has a green strength in about 4 to 5 hours. For most compositions, good green strength is obtained overnight. Thereafter, the refractory body can be treated at an elevated temperature to remove water, typically in the range of 150° to 750° C.

Refractory bodies formed using the low coefficient of thermal expansion of the present invention have high levels of strength and are resistant to cracking at elevated temperatures because of the controlled coefficient of thermal expansion. Prior material using steel reinforcing undergoes selective oxidation of the steel. Oxidation continues progressively until overall strength is compromised due to loss of reinforcement and eventually the material fails.

The refractory bodies of the present invention are useful in molten metal treatment processes. For example, the refractory bodies can be formed to accept electric heaters and used for baffle heaters to treat molten metal, such as aluminum as well as other metals.

Further, the refractory bodies can be used as liners and blocks for molten metal furnaces and great use in high temperature applications where thermal stress is a concern.

While the invention has been described in terms of preferred embodiments, the claims appended hereto are intended to encompass other embodiments which fall within the spirit of the invention.

What is claimed is:

1. A method for preparing a metal reinforced refractory body resistant to cracking at elevated temperatures comprising the steps of:

(a) providing a mold for containing a slurry of refractory material;

(b) inserting a body of metal fibers into said mold, said metal fibers having a coefficient of thermal expansion of less than $10\times10^{-6}$ in/in/° F. in the temperature range of 400° to 2000° F. and having a yield strength of greater than 35 KS at 1200° F.;

(c) introducing said slurry of refractory material to said mold to provide said slurry in intimate contact with said metal fibers, said refractory material in the hardened condition having a coefficient of thermal expansion of less than $5\times10^{-6}$ in/in/° F.;

(d) hardening said refractory material to provide a metal reinforced composite refractory body comprised of a reinforcing component and a refractory component having a coefficient of thermal expansion of less than $5\times10^{-6}$ in/in/° F. to minimize cracking of the refractory body.

2. The method in accordance with claim 1 including providing metal fibers in said body in the range of 1 to 25 wt. % based on the total weight of fibers and refractory.

3. The method in accordance with claim 1 wherein said metal fibers are selected from the group consisting of nickel based alloys, Fe-Ni based alloys, Fe-Ni-Co based alloys, Ti based alloys, and Ni-Co based alloys.

4. The method in accordance with claim 1 wherein said metal fibers are oxidation resistant at elevated temperatures.

5. The method in accordance with claim 1 wherein said metal fibers have a coefficient of thermal expansion of less than $7\times10^{-6}$ in/in/° F.

6. The method in accordance with claim 1 wherein the metal fibers are comprised of a nickel based alloy selected from the group consisting of alloys 904, 903, 907, 908 and 909.

7. The method in accordance with claim 1 wherein the metal fibers are comprised of a nickel based alloy selected from the group consisting of alloys 625, 783 and 718.

8. The method in accordance with claim 1 wherein the metal fibers are comprised of a nickel based alloy selected from the group consisting of alloys 36 and 42.

9. The method in accordance with claim 1 wherein the metal fibers are comprised of a nickel based alloy selected from the group consisting of Haynes alloy 242.

10. The method in accordance with claim 1 wherein said metal fibers have an oxidation resistance of less than 15 $mg/cm^2$ (measured by weight gain).

11. A metal reinforced refractory body comprised of a metal component having a coefficient of thermal expansion of less than $10\times10^{-6}$ in/in/° F. and having a yield strength of greater than 35 KSI at 1200° F. and a refractory component having a coefficient of thermal expansion of less than $10\times10^{-6}$ in/in/° F., the body being highly resistant to cracking at elevated temperatures.

12. The refractory body in accordance with claim 11 wherein said metal component is comprised of metal fibers present in said body in the range of 1 to 25 wt. % based on the total weight of fibers and refractory.

13. The refractory body in accordance with claim 11 wherein said metal fibers are selected from the group consisting of nickel based alloys, Fe-Ni based alloys, Fe-Ni-Co based alloys, and Ti based alloys.

14. The refractory body in accordance with claim 11 wherein said metal fibers are oxidation resistant at elevated temperatures.

15. The refractory body in accordance with claim 11 wherein said metal fibers have a coefficient of thermal expansion of less than $7\times10^{-6}$ in/in/° F.

16. The refractory body in accordance with claim 11 wherein said metal fibers are comprised of a nickel based alloy selected from the group consisting of alloys 904, 903, 907, 908 and 909.

17. The refractory body in accordance with claim 11 wherein the metal fibers are comprised of a nickel based alloy selected from the group consisting of alloys 625, 783 and 718.

18. The refractory body in accordance with claim 11 wherein the metal fibers are comprised of a nickel based alloy selected from the group consisting of alloy 242.

19. The refractory body in accordance with claim 11 wherein said metal fibers have an oxidation resistance of less than 15 $mg/cm^2$ (measured by weight gain).

* * * * *